United States Patent [19]

Jadhav

[11] Patent Number: 6,087,318

[45] Date of Patent: Jul. 11, 2000

[54] PROCESS TO PRODUCE DISPROPORTIONATED ROSIN BASED EMULSIFIER FOR EMULSION POLYMERIZATION

[75] Inventor: Jalandar Y. Jadhav, Crossett, Ark.

[73] Assignee: Georgia-Pacific Resins, Inc., Atlanta, Ga.

[21] Appl. No.: 09/174,446

[22] Filed: Oct. 19, 1998

[51] Int. Cl.[7] .............................. C11D 15/04; C09F 1/04
[52] U.S. Cl. .................. 510/458; 510/460; 510/486; 510/487; 252/367.1; 530/212; 530/213; 530/225; 530/226; 530/227; 530/230; 530/233
[58] Field of Search ..................... 510/458, 460, 510/486, 487; 252/367.1; 530/212, 213, 225, 226, 227, 230, 233

[56] References Cited

U.S. PATENT DOCUMENTS

| | | |
|---|---|---|
| 1,131,939 | 3/1915 | Melamid . |
| 3,544,474 | 12/1970 | Shaffer ................................ 510/438 |
| 3,860,569 | 1/1975 | Ward . |
| 3,864,297 | 2/1975 | Hornbaker et al. .............. 260/29.6 R |
| 3,980,630 | 9/1976 | Ishigami et al. . |
| 4,271,066 | 6/1981 | Matsuo et al. . |
| 4,370,252 | 1/1983 | Uraneck et al. .................. 252/311 |
| 4,385,157 | 5/1983 | Auclair et al. .................... 525/316 |
| 4,447,354 | 5/1984 | Scharrer et al. .................. 260/106 |
| 4,481,145 | 11/1984 | Timms . |
| 4,659,513 | 4/1987 | Correia . |
| 4,788,009 | 11/1988 | Johnson, Jr. . |
| 4,822,526 | 4/1989 | Tsuchida et al. . |
| 4,847,010 | 7/1989 | Maeda et al. .................... 530/216 |
| 5,023,319 | 6/1991 | Hollis et al. . |
| 5,175,250 | 12/1992 | Hazen . |
| 5,552,519 | 9/1996 | Hemmings et al. .............. 530/216 |

FOREIGN PATENT DOCUMENTS

| | | |
|---|---|---|
| 2942599 | 5/1980 | Germany . |
| 57-165499 | 10/1982 | Japan . |
| 60-115675 | 6/1985 | Japan . |
| 143038 | 12/1987 | Poland . |

OTHER PUBLICATIONS

Klyuev, A. et al. "Preparation of Rosin–Terpene–Maleic Resins from Turpentine", ZH. Prikl, Khim. (St.Peterburg), 70(12), pp. 2056–2060, 1997. (Abstract Only).

Ishigami et al., "Disproportionation Reaction of Rosin and Tall Oil with Metal Iodides," *Yukagaku*, (1976), 25(8), 463–9 (SciFinder English Language Abstract of Japanese Journal).

Blade–Font et al., "Use of N–lithio Ethylenediamine as a Dehydrogenation Agent of Diterpene Acids. Preparation of (+)–Dehydroabietic Acid from Rosin or from (−)–Abietic Acids," *Afinidad* (171), 28(292), 1301–8 (SciFinder English Language Abstract of Spanish Journal).

*Primary Examiner*—Lorna M. Douyon
*Attorney, Agent, or Firm*—Banner & Witcoff, Ltd.

[57] ABSTRACT

A process for disproportionating rosins using iodide catalysts. In one embodiment, a tall oil rosin is heated in the presence of a lithium iodide catalyst. In another embodiment, a catalyst system is formed from a mixture of lithium iodide and ferrous iodide. The mixed catalyst system completes disproportionation of tall oil rosin in about three hours. Phosphoric acid may be added to remove iron colored impurities when using the mixed catalyst system. Another aspect of the invention involves preparing a soap from the disproportionated rosin by adding a defoamer and a base, such as potassium hydroxide.

24 Claims, No Drawings

PROCESS TO PRODUCE DISPROPORTIONATED ROSIN BASED EMULSIFIER FOR EMULSION POLYMERIZATION

FIELD OF THE INVENTION

The present invention relates to the disproportionation of unsaturated acids in a rosin. More particularly, the invention relates to the disproportionation of rosin and fatty acids in tall oil using one or more catalysts. The invention further relates to the preparation of a soap suitable for emulsion polymerization from the disproportionated rosin.

BACKGROUND OF THE INVENTION

Emulsion polymerization involves the use of a suitable surfactant or soap for polymerizing a water-insoluble monomer or monomers in an aqueous dispersion. The surfactant or soap generates micelles which are the actual polymerization loci. As the polymerization proceeds, the micelle grows by imbibing monomer or monomers and ultimately yields a microscopic polymer particle. The final product is an aggregate of these particles which is a milky latex that contains 20–40% solids. The latex may be used directly, as in latex paint, or can be coagulated to recover the dry polymer.

Emulsion polymerization may be used to produce very high molecular weight polymers by free radical mechanism, as is widely practiced by and commercially important to the rubber industry. The use of water as a diluent and heat transfer medium is very advantageous in emulsion polymerization processes.

The primary disadvantage of emulsion polymerization techniques is that a high concentration (up to 6 weight percent) of emulsifier residue inherently remains in the coagulated polymer.

It is thus advantageous to employ an emulsifier system which is compatible with prior processing, assembly, and vulcanization operations. Rosin and fatty acid emulsifiers are the materials of choice because of their secondary advantages in rubber processing. Rosin is a necessary ingredient to improve the rubber's milling characteristics.

The unmodified rosin contains 30–50 wt % of abietic acid isomer which is known to retard the polymerization reaction and produces unwanted polymer structures. It is desirable to have less than 1 wt % abietic acid in the modified rosin in order to produce a quality emulsifier. The chemical reaction which produces emulsifier-grade rosin is known as "disproportionation of rosin." In the disproportionation of rosin, most of the abietic acid is converted to dehydroabietic acid by a dehydrogenation reaction.

The disproportionation of rosin is generally carried out with a suitable catalyst at an elevated temperature. A palladium on carbon catalyst has been used for disproportionation, but is unsuitable for disproportionation of tall oils due to sulfur impurities which poison the catalyst. Other catalyst systems include organic phenol sulfide, iodine, and metal iodides with and without iron for producing disproportionated tall oil based rosin for emulsifiers. For example, U.S. Pat. No. 4,271,066 to Matsuo et al. teaches a process for disproportionating rosin in the presence of a catalyst comprising (1) at least one iodide selected from the group consisting of sodium iodide and potassium iodide, and (2) at least one iron compound selected from the group consisting of iron, iron oxides, iron hydroxides and iron sulfides.

The production of liquid rosin esters using a thermal reaction between rosin and an alcohol in the presence of anthraquinone and at least one alkali metal iodide is described in U.S. Pat. No. 4,822,526 to Tsuchida et al. The alkali metal iodide is either sodium iodide or potassium iodide. Other related art includes U.S. Pat. No. 4,481,145 to Timms, which discloses a method for disproportionating rosin or tall oil by heating the rosin or tall oil with a catalyst comprising iodine and an iron compound using ammonia, an ammonium salt, or an amine as an additional component of the catalyst. The method described in U.S. Pat. No. 4,659,513 to Correia is similar to that of Timms but includes a pretreatment step by which the starting material is heated with an effective amount of elemental sulphur.

A process for treating tall oil fatty acids with a bromine-iodine catalyst mixture to convert the linoleic acid portion to oleic acid and other fatty acids is set forth in U.S. Pat. No. 3,860,569 to Ward. The source of the iodine catalyst may be as free iodine or such iodine sources as amine hydroiodides, aliphatic organic iodides and inorganic iodides, such as aluminum iodides.

U.S. Pat. No. 5,023,319 to Hollis et al. discloses a method for treating polymerized rosin to decrease its tendency to oxidize comprising heating the rosin to an elevated temperature in the presence of a catalytic amount of any known disproportionating agents such as iodine. Other patents include U.S. Pat. No. 5,175,250 to Hazen (producing a stabilized rosin by heating the rosin in the presence of a phosphoric acid or a strong acid in combination with a phosphate-containing substance and disproportionating the rosin by the addition of iodine); U.S. Pat. No. 4,788,009 to Johnson, Jr. (preparing a polyol ester of rosin, which comprises esterifying the rosin with the polyol in the presence of a catalytic proportion of a compound selected from the group consisting of alkali metal salts and alkaline earth metal salts of either phosphorous acid or hypophosphorous acid); U.S. Pat. No. 1,131,939 to Melamid (manufacturing pure resin-oil by heating a mixture of resin and phosphoric acid); and U.S. Pat. No. 3,544,474 to Shaffer (soap composition comprising a dry mixture of an alkali metal soap of a disproportionated rosin distended on a finely-divided microporous hydrous calcium silicate).

SUMMARY OF THE INVENTION

It is an object of the present invention to provide a more efficient and cost-effective catalyst system for disproportionation of rosins which yields a disproportionated rosin having a high acid value.

It is another object of the present invention to provide a catalyst system for disproportionation of rosins which yields a disproportionated rosin having less unsafonifiables than the prior art systems.

It is yet another object of the invention to produce a soap from the disproportionated rosin more efficiently than the prior art processes. Other objects, features, and advantages of the invention will be evident from the following disclosure.

It was found that a process for treating tall oil rosins with a lithium iodide catalyst is effective to convert abietic acid to dehydroabietic acid. A catalyst formed from a mixture of lithium iodide and ferrous iodide was also found to be effective for use in the disproportionation reaction. The lithium iodide and ferrous iodide are preferably mixed at a ratio from about 1:9 to about 9:1.

In either embodiment, the catalyst is preferably provided in a concentration of from about 0.75 to about 4.5 wt %, and the disproportionation reaction is preferably carried out at a temperature of from about 200° C. to about 235° C. The mixed catalyst system completes disproportionation of tall oil rosin in about three hours. Phosphoric acid may optionally be added to remove iron colored impurities when using the mixed catalyst system, preferably in a concentration of from about 0.1 to about 1 wt %.

Another aspect of the invention involves preparing a soap from the disproportionated rosin by adding a defoamer and a base. The defoamer is preferably 10 wt % active silicone filled with silica, and preferably is provided in a concentration of from about 0.1 to about 1 wt %. The base is preferably potassium hydroxide and preferably is provided in a concentration of from about 18 to about 24 wt %.

DETAILED DESCRIPTION OF THE PREFERRED EMBODIMENTS

The present invention is directed to a process for producing a disproportionated rosin based emulsifier by heating a rosin in the presence of a catalyst. Unless otherwise indicated, all weight percentages recited herein are based on the total weight of the rosin.

Lithium iodide was found to be a suitable catalyst for the disproportionation reaction and preferably is used in a concentration of from about 0.75 to about 4.5 wt %, more preferably from about 0.8 to about 2.5 wt %, and most preferably from about 1 to about 1.2 wt %.

A lithium iodide/ferrous iodide mixed catalyst system was also found to be effective for the disproportionation reaction. Preferably the mixed catalyst is used in a concentration of from about 0.75 to about 4.5 wt %, more preferably from about 0.8 to about 2.5 wt %, and most preferably from about 1 to about 1.2 wt %. Solutions of lithium iodide and ferrous iodide are preferably mixed at a ratio of from about 1:9 to about 9:1, more preferably from about 4:6 to about 6:4, and most preferably at a ratio of about 1:1 to form the mixed catalyst system.

The rosin may be obtained from any known source, such as a LYTOR 100 grade tall oil rosin available from Georgia-Pacific, and resin grade rosin from other suppliers.

The lithium iodide may also be obtained from any known source. Normally the lithium iodide is available in solution, typically between 50 and 60 wt %. For example, a 55 wt % solution of lithium iodide available from Ajay Chemicals may be used. Ferrous iodide is also readily available in solution, typically between 35 and 50 wt %. A 40 wt % solution of ferrous iodide available from Ajay Chemicals may be used in accordance with the invention.

Phosphoric acid is typically available in concentrations of 30 to 100 wt %. For example, an 85 wt % solution of phosphoric acid available from Aldrich Chemicals may be used.

Defoamers which may be used include Protocol LB8050, Antifoam FG-10, Antifoam TA 20 F6. A suitable defoamer for use with the invention is a 10 wt % active silicone filled with silica under the trade designation Antifoam TA-10FG, available from Taylor Chemicals.

Any suitable base may be used to adjust the pH, such as sodium hydroxide or potassium hydroxide. These solutions are typically available in concentrations between 40 and 60 wt %. For example, a 45 wt % solution of potassium hydroxide available from Harcros Chemicals may be used.

The rosin and catalyst may be combined in a glass reactor and heated with agitation, preferably at a temperature of from about 200° C. to about 235° C., more preferably from about 215° C. to about 220° C., for about three hours. When using the mixed catalyst, phosphoric acid may optionally be added to remove iron colored impurities. The phosphoric acid is preferably added at a concentration of from about 0.1 to about 2 wt %, more preferably from about 0.1 to about 1 wt %, and most preferably about 0.12 wt %.

A soap may be prepared by charging and heating the disproportionated rosin in a glass reactor, preferably to a temperature of from about 130° C. to about 180° C., more preferably about 170° C., and adding defoamer preferably in a concentration of from about 0.1 to about 2 wt %, more preferably from about 0.1 to about 1 wt %, and most preferably about 0.12 wt %. The defoamer prevents excessive foaming and allows the base to be added before the temperature drops significantly. Immediately thereafter, the base is added to the reactor, preferably in a concentration of from about 18 to about 24 wt %, more preferably about 22 wt %.

EXAMPLES

The following illustrative examples are provided for a better understanding of the invention. These examples are illustrative of preferred aspects of the invention and are not intended to limit the scope of the invention.

Example 1

1000 g of LYTOR 100 rosin and 12 g of 55 wt % lithium iodide solution were charged into a four-necked glass reactor at 150° C., and heated with agitation at 220° C. for three hours under a nitrogen blanket. Table 1 summarizes the properties of the rosin before and after the disproportionation reaction.

TABLE 1

|  | Untreated Rosin | Disproportionated Rosin |
| --- | --- | --- |
| Acid Number | 179.7 | 167.9 |
| Rosin Acids, wt % | 92.9 | 84.2 |
| Fatty Acids, wt % | 3.8 | 5.7 |
| Color, Gardner | 5 | 6 |
| Melting Point, ° C. | 74.1 | 59.0 |
| Abietic Acid, wt % | 42.1 | 0.3 |
| Dehydroabietic Acid, wt % | 20.0 | 46.5 |

Example 2

1000 g of LYTOR 100 rosin and 12 g of mixed iodide solution (10 g of 55 wt % lithium iodide solution and 2 g of 40 wt % ferrous iodide solution) were charged into a four-necked glass reactor at 150° C., and heated with agitation at 220° C. for three hours under a nitrogen blanket. The disproportionated rosin was treated with 1.5 g of 85 wt % phosphoric acid. Table 2 summarizes the properties of the rosin before and after the disproportionation reaction.

TABLE 2

|  | Untreated Rosin | Disproportionated Rosin |
| --- | --- | --- |
| Acid Number | 180.4 | 170.9 |
| Rosin Acids, wt % | 93.9 | 86.8 |
| Fatty Acids, wt % | 3.1 | 4.9 |
| Color, Gardner | 6 | 6 |
| Melting Point, ° C. | 75.9 | 65.8 |
| Abietic Acid, wt % | 44.0 | 0.4 |
| Dehydroabietic Acid, wt % | 15.4 | 48.8 |

Example 3

1000 g of LYTOR 100 rosin and 10 g of mixed iodide catalyst solution (5 g of 55 wt % lithium iodide solution and 5 g of 40 wt % ferrous iodide solution) were charged into a four-necked glass reactor at 150° C., and heated with agitation at 220° C. for three hours under a nitrogen blanket. The disproportionated rosin was treated with 2 g of 85 wt % phosphoric acid at 220° C. Table 3 summarizes the properties of the rosin before and after the disproportionation reaction.

TABLE 3

|  | Untreated Rosin | Disproportionated Rosin |
| --- | --- | --- |
| Acid Number | 177.9 | 172.3 |
| Rosin Acids, wt % | 91.6 | 88.0 |
| Fatty Acids, wt % | 4.0 | 4.9 |
| Color, Gardner | 6 | 6 |
| Melting Point, ° C. | 72.2 | 66.9 |
| Abietic Acid, wt % | 41.4 | 0.1 |
| Dehydroabietic Acid, wt % | 16.8 | 48.6 |

Example 4

1000 g of LYTOR 100 rosin and 10 g of mixed iodide catalyst solution (2 g of 55 wt % lithium iodide solution and 8 g of 40 wt % ferrous iodide solution) were charged into a four-necked glass reactor at 150° C., and heated with agitation at 220° C. for three hours under a nitrogen blanket. The disproportionated rosin was further treated with 2 g of 85 wt % phosphoric acid at 220° C. for one-half hour. Table 4 summarizes the properties of the rosin before and after the disproportionation reaction.

TABLE 4

|  | Untreated Rosin | Disproportionated Rosin |
| --- | --- | --- |
| Acid Number | 178.1 | 171.5 |
| Rosin Acids, wt % | 91.5 | 87.2 |
| Fatty Acids, wt % | 4.2 | 4.8 |
| Color, Gardner | 5 | 6 |
| Melting Point, ° C. | 72.2 | 65.2 |
| Abietic Acid, wt % | 42.8 | 0.1 |
| Dehydroabietic Acid, wt % | 16.6 | 49.1 |

Example 5

1000 g of disproportionated rosin (example 4) was charged into a four-necked glass reactor and heated to 170° C. Then 1.1 g of defoamer (Antifoam TA-10FG) was added and, immediately, 346 g of 45 wt % potassium hydroxide solution was added. The final soap had an acid number of 16.2, a solids content of 80.2 wt %, and a pH of 9.5.

Comparative Example

Soaps made from the disproportionated rosins of example 3 and 4 were tested side by side with commercially available rosin acid soap (RAS) in emulsion polymerization bottle tests. The bottle tests were carried out using the following recipe:

| Ingredient | Purity, wt % | Parts |
| --- | --- | --- |
| Butadiene | 91.7 | 78.53 |
| Styrene | 95.5 | 29.32 |
| Soap Solution | 12.8 | 35.64 |

| Ingredient | Purity, wt % | Parts |
| --- | --- | --- |
| Activator Solution | 92.5 | 11.08 |
| Modifier | 100 | 00.23 |
| Catalyst | 43 | 00.07 |
| Water | 100 | 136.41 |

The part to actual bottle charge weight factor is 1.5.

The emulsion polymerization was carried out at 55° F. and polymerization was terminated after 3.5 hours. The polymerization results are summarized in Table 5 below.

TABLE 5

| Property | Example 3 | Example 4 | RAS |
| --- | --- | --- | --- |
| Total Solids Conversion, wt % | 24.7 | 26.2 | 22.1 |
| Monomer Conversion, wt % | 62 | 67 | 55 |
| Polymer Viscosity, Mooney | 51.5 | 75.5 | 52.2 |

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

I claim:

1. A process for producing a disproportionated rosin based emulsifier having less than 1 wt % abietic acid, the process comprising heating a rosin in the presence of an effective catalytic amount of a catalyst of lithium iodide.

2. The process of claim 1 wherein the rosin is a tall oil rosin.

3. The process of claim 1 wherein the catalyst is provided at a concentration of from about 0.75 to about 4.5 wt %.

4. The process of claim 1 wherein the catalyst is provided at a concentration of from about 0.8 to about 2.5 wt %.

5. The process of claim 1 wherein the catalyst is provided at a concentration of from about 1 to about 1.2 wt %.

6. The process of claim 1 wherein the disproportionation reaction is carried out at a temperature of from about 200° C. to about 235° C.

7. The process of claim 1 wherein the disproportionation reaction is carried out at a temperature of from about 215° C. to about 220° C.

8. A process for producing a disproportionated rosin based emulsifier having less than 1 wt % abietic acid, the process comprising heating a rosin in the presence of an effective catalytic amount of a catalyst system, the catalyst system comprising lithium iodide and ferrous iodide.

9. The process of claim 8 wherein the rosin is a tall oil rosin.

10. The process of claim 8 wherein the catalyst system is provided at a concentration of from about 0.75 to about 4.5 wt %.

11. The process of claim 8 wherein the catalyst system is provided at a concentration of from about 1 to about 1.2 wt %.

12. The process of claim 8 wherein a first solution of lithium iodide and a second solution of ferrous iodide are mixed at a lithium iodide:ferrous iodide ratio of from about 1:9 to about 9:1 to form the catalyst system.

13. The process of claim 12 wherein the lithium iodide:ferrous iodide ratio is from about 4:6 to about 6:4.

14. The process of claim 8 wherein the disproportionation reaction is carried out at a temperature of from about 200° C. to about 235° C.

15. The process of claim 8 wherein the disproportionation reaction is carried out at a temperature of from about 215° C. to about 220° C.

16. The process of claim 8, further comprising treating the disproportionated rosin with phosphoric acid.

17. The process of claim 16 wherein a solution of phosphoric acid is added to the disproportionated rosin at a concentration of from about 0.1 to about 2 wt %.

18. The process of claim 16 wherein a solution of phosphoric acid is added to the disproportionated rosin at a concentration of from about 0.1 to about 1 wt %.

19. A process for preparing a soap, the process comprising adding a defoamer and a base to a disproportionated rosin produced by claim 1.

20. The process of claim 19 wherein the defoamer is 10 wt % active silicone filled with silica.

21. The process of claim 19 wherein the defoamer is added to the disproportionated rosin at a concentration of from about 0.1 to about 2 wt %.

22. The process of claim 19 wherein the defoamer is added to the disproportionated rosin at a concentration of from about 0.1 to about 1 wt %.

23. The process of claim 19 wherein the base is a solution of potassium hydroxide and wherein the base is added to the disproportionated rosin at a concentration of from about 18 to about 24 wt %.

24. A process for preparing a soap by adding a defoamer and a base to the disproportionated rosin produced by claim 8.

* * * * *